United States Patent
Gleman et al.

[11] Patent Number: 5,970,798
[45] Date of Patent: Oct. 26, 1999

[54] ULTRASONIC BOLT GAGE

[75] Inventors: Stuart M. Gleman, Titusville; Geoffrey K. Rowe, Winter Park, both of Fla.

[73] Assignee: The United States of America as represented by the Administrator of the National Aeronautics and Space Administration, Washington, D.C.

[21] Appl. No.: 08/936,788

[22] Filed: Sep. 25, 1997

[51] Int. Cl.[6] ............................................. F16B 31/02
[52] U.S. Cl. ............................................. 73/761
[58] Field of Search ................................... 73/761, 649

[56] References Cited

U.S. PATENT DOCUMENTS

| | | | |
|---|---|---|---|
| 3,969,810 | 7/1976 | Pagano | 29/407 |
| 4,062,227 | 12/1977 | Heyman | 73/630 |
| 4,308,751 | 1/1982 | Thurner et al. | 73/627 |
| 4,363,242 | 12/1982 | Heyman | 73/761 |
| 4,471,657 | 9/1984 | Voris et al. | 73/761 X |
| 4,640,131 | 2/1987 | Kroning et al. | 73/600 |
| 4,818,470 | 4/1989 | Richardson et al. | 376/245 |
| 5,029,480 | 7/1991 | Kibblewhite | 73/761 |
| 5,156,050 | 10/1992 | Schmid et al. | 73/761 X |
| 5,161,594 | 11/1992 | Bolton et al. | 73/761 X |
| 5,220,839 | 6/1993 | Kibblewhite | 73/761 |
| 5,404,643 | 4/1995 | Rice | 73/761 |
| 5,440,929 | 8/1995 | Huang et al. | 73/628 |
| 5,499,540 | 3/1996 | Whaley et al. | 73/761 |
| 5,571,971 | 11/1996 | Chastel et al. | 73/761 |
| 5,584,627 | 12/1996 | Ceney et al. | 73/761 X |
| 5,663,503 | 9/1997 | Dam et al. | 73/649 |
| 5,675,087 | 10/1997 | MacLauchlan et al. | 73/761 |
| 5,717,143 | 2/1998 | Jenco et al. | 73/761 |
| 5,807,048 | 9/1998 | D'agraives et al. | 73/761 X |

OTHER PUBLICATIONS

Leisk, G.G., et al., "Digital Computer Algorithms to Calculate Ultrasonic Wave Speed", *Materials Evaluation*, 840–843, (July 1996).

*Primary Examiner*—George Dombroske
*Assistant Examiner*—Jewel V. Thompson
*Attorney, Agent, or Firm*—Beth A. Vrioni; Gary G. Borda

[57] ABSTRACT

An ultrasonic bolt gage is described which uses a cross-correlation algorithm to determine a tension applied to a fastener, such as a bolt. The cross-correlation analysis is preferably performed using a processor operating on a series of captured ultrasonic echo waveforms. The ultrasonic bolt gage is further described as using the captured ultrasonic echo waveforms to perform additional modes of analysis, such as feature recognition. Multiple tension data outputs, therefore, can be obtained from a single data acquisition for increased measurement reliability. In addition, one embodiment of the gage has been described as multi-channel, having a multiplexer for performing a tension analysis on one of a plurality of bolts.

18 Claims, 7 Drawing Sheets

ULTRASONIC BOLT GAGE

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 U.S.C. 2457)

TECHNICAL FIELD OF THE INVENTION

The present invention relates generally to bolt gages and in particular the present invention relates to a system and method of measuring the tension placed upon a bolt using ultrasonics.

BACKGROUND OF THE INVENTION

Reliable and accurate bolt tension gages are an essential tool in the Kennedy Space Center (KSC) operational environment to determine the amount of preload in critical bolts and studs that are located in both ground support equipment and flight hardware. Experience at KSC has shown that commercially available ultrasonic bolt gages have problems taking required measurements. Existing bolt gages perform adequately in most instances, but can produce unacceptable errors and uncertainties when performing tension measurements in some configurations of flight hardware. These errors and uncertainties often result from interference due to multiple return waveforms from an ultrasonic pulse launched through the bolt or stud being measured. These errors are caused by apparent changes in amplitude, peak splits, peak merges, and distortion in return waveforms being analyzed and the bolt gage's inability to compensate for these phenomena. Other factors that affect the accuracy of a measurement include the tensioning process which may cause changes in geometry and material characteristics, temperature changes between unloaded and loaded conditions, contamination between the transducer and the surface of the item under test, contact pressure between the transducer and the item under test, and changing or removing and replacing a transducer during the process.

Figure 1A:
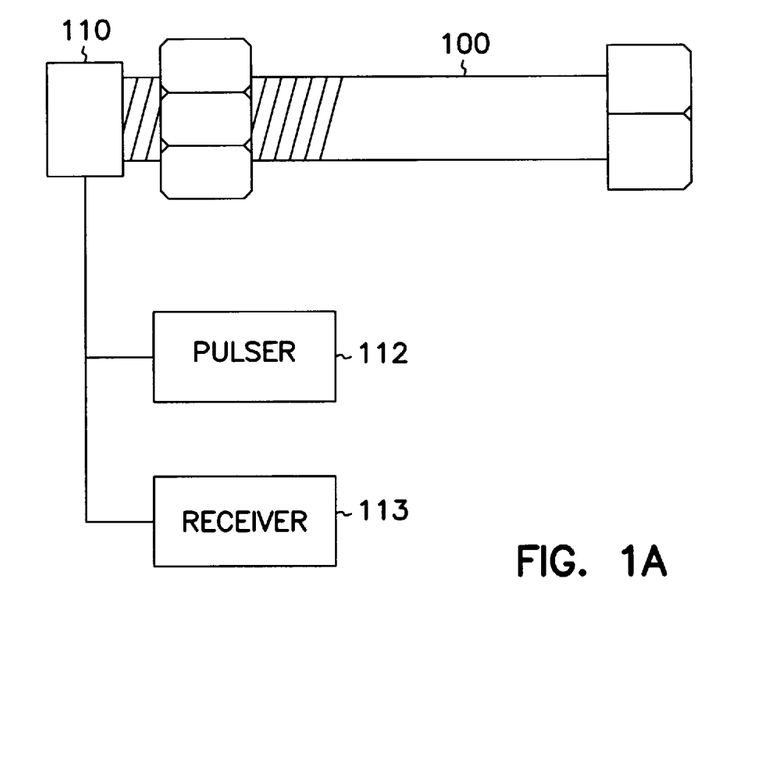
FIG. 1A is a prior art ultrasonic transducer coupled to a bolt.

Most commercial bolt gages operate by determining the time-of-flight (TOF) of an ultrasonic return pulse in a bolt or stud. The TOF is measured by selecting a single feature of the item under test. Typically, an ultrasonic transducer 110 is mounted at one end of the item under test, such as a bolt 100, a pulse is launched through the item by a pulser circuit 112 simultaneously, the electronic clock is started. The time is measured for a return signal, or echo pulse as detected by a receiver 113 (See FIG. 1A). The traditional gage uses a single waveform feature such as the slope and trigger level setting as the requirement for stopping the clock. This single feature TOF is the basis for comparison and measurement. The difference between an unloaded (zero applied tension) and loaded TOF measurement for a particular bolt or stud is compared in terms of nanoseconds. Since each tension state has a unique sound speed associated with it, the nanoseconds interval can be converted to an ultrasonic length. Provided there is no permanent deformation in the item under test, the preload of the bolt or stud may be calculated either by using Hooke's Law or using a pre-determined plot of ultrasonic length (or TOF) versus load, taking into account the speed of sound change in the material under load and compensating for the other factors, such as temperature.

That is, preload can be determined by correlating the first return waveform of a bolt in both an unloaded and a loaded state. The amount of the time shift measured between these states is proportional to the preload tension in a joint coupled by the bolt. The two time measurements are compared to determine how far the waveform has been displaced in time. The time difference is proportional to the stretch in the bolt. This method and traditional bolt gages rely on an arbitrary zero or starting point. The resulting TOF includes the length for an equipment cable, transducer and couplant delays, as well as any delays in the measuring device. These are all system related external errors and can be subtracted out. Thus, an unloaded length or TOF is obtained and recorded.

In a second method, the first and second return (echo) waveforms are correlated to produce the actual TOF in the item under test rather than including the elements of the total measurement system. The first return waveform is used as the reference for the second return waveform. By considering the time between the first and second returns, the external variables in the first TOF method and typical bolt gages are eliminated. A reference table for each bolt, which plots tension versus delay time, is consulted to determine bolt tension. This plot is typically slightly parabolic in shape.

A problem with bolts in critical applications is that they are usually very lightweight in comparison to the load they bear. This creates a maximum preload tension value. That is, if the bolts are over-tensioned before load, they can yield or break upon application of the load. Likewise, there is also a minimum preload to prevent a joint from separating. It is well known that simple torque preload techniques result in a +/30% variation in tension preload, and that this is usually unacceptable in critical joints.

In the 30 years since the ultrasonic bolt gage was first invented, many methods have been tried to increase the level of repeatability and confidence in the accuracy of readings taken with these instruments. When a modern ulrasonic bolt gage and its operator are performing properly, these instruments can measure to an accuracy of +/− 2%. Unfortunately, on the all too often occasions when a gage reading "jumps peak," a user's confidence in the data collected is significantly reduced. A significant amount of peak jump error is a result of the reliance on one single feature to meet the same measurement and trigger criteria in the waveform in both unloaded to loaded conditions. Thus, current bolt gages while accurate are not reliable. For example, when a current bolt gage is used in the critical situation such as testing bolts on a space station or rocket, a reliability error of 10 to 30 percent is unacceptable. This unreliability is more than an annoyance, it can create an unacceptably dangerous situation. If a technician has 10 critical bolts which must be tensioned within a particular window, and the bolt gage used as a plus or minus 30% error one time in 10, the technician cannot insure that all 10 bolts are correctly tensioned.

Figure 1B:
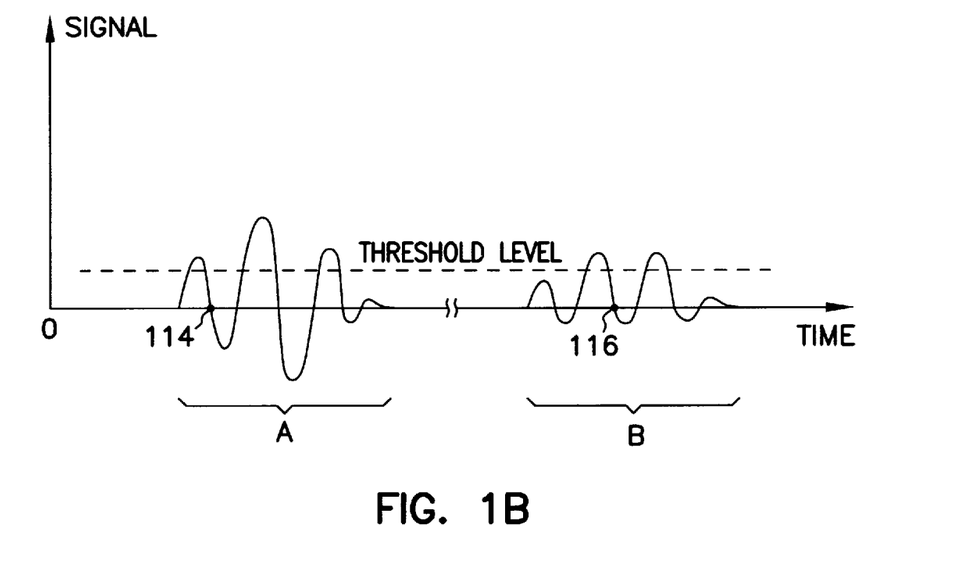
FIG. 1B illustrates ultrasonic echo waveforms from the transducer of FIG. 1A.

See FIG. 1B where the first ultrasonic wave, A, of a slack bolt has a first zero-crossing 114 after the signal crosses the threshold level. Waveform B is an echo pulse of the bolt under tension. Because the waveform is deformed, in this illustration, simply attenuated, the zero-crossing 116 following the threshold level does not correspond to that of the first waveform. This creates substantial errors when calculating tension depending upon the single waveform feature. This is a common effect of tensioning a bolt.

For the reasons stated above, and for other reasons stated below which will become apparent to those skilled in the art upon reading and understanding the present specification, there is a need in the art for a more reliable ultrasonic bolt gage.

SUMMARY OF THE INVENTION

The above mentioned problems with bolt gages and other problems are addressed by the present invention and which will be understood by reading and studying the following specification. The above mentioned problems with bolt gages and other problems are addressed by the present invention and which will be understood by reading and studying the following specification. A bolt gage is described which uses cross-correlation of multiple ultrasonic echo signals to determine tension applied to a bolt. The bolt gage can include additional analysis techniques such as feature recognition and/or other mathematical techniques to provide multiple modes of analysis using the same acquired data in order to increase measurement reliability. Further, the present invention can be multi-channel and include a plurality of remotely spaced transducers.

In particular, the present invention describes an ultrasonic bolt gage comprising an ultrasonic transducer for coupling to a bolt, transmitting ultrasonic signals through the bolt, and providing echo waveform output signals. The gage includes a processor coupled to the ultrasonic transducer for controlling the transmission of the series of ultrasonic signals and receiving the output signals. The processor provides analysis outputs indicating a tension applied to the bolt using both cross-correlation and feature recognition analysis.

In another embodiment a multi-channel ultrasonic bolt gage comprises a plurality of ultrasonic transducers for coupling to a plurality of bolts, transmitting ultrasonic signals through the bolts, and providing echo waveform output signals. A plurality of temperature sensors are located in proximity to and in thermal contact with the plurality of bolts, and a processor is coupled to receive the ultrasonic echo waveform output signals as well as the outputs from the plurality of temperature sensors. The processor provides analysis outputs indicating a tension applied to one of the plurality of bolts using both cross-correlation and feature recognition analysis. The bolt gage further includes a waveform capturing device for storing a digital representation of the echo waveform output signals from the plurality of ultrasonic transducers and transmitting the echo waveform output signals to the processor, and a multiplex circuit for coupling one of the plurality of ultrasonic transducers to the waveform capturing device and coupling one of the plurality of temperature sensors to the processor.

In another embodiment, a method is described for determining a tension applied to a bolt. The method comprises the steps of transmitting an ultrasonic signal through the bolt, capturing a series of echo waveforms of the pulse train transmitted through the bolt, and cross-correlating two captured echo waveforms to determine the tension applied to the bolt. The step of cross-correlating can comprise the steps of communicating the captured series of echo waveforms to a processor, instructing the processor to perform a series of integrations of a product of two consecutive echo waveforms over a range of time shifts to identify a time-of-flight of the ultrasonic signals, and determining a tension applied to the bolt based upon the identified time-of-flight.

DETAILED DESCRIPTION OF THE INVENTION

In the following detailed description of the preferred embodiments, reference is made to the accompanying drawings which form a part hereof, and in which is shown by way of illustration specific preferred embodiments in which the inventions may be practiced. These embodiments are described in sufficient detail to enable those skilled in the art to practice the invention, and it is to be understood that other embodiments may be utilized and that logical, mechanical and electrical changes may be made without departing from the spirit and scope of the present inventions. The following detailed description is, therefore, not to be taken in a limiting sense, and the scope of the present inventions is defined only by the appended claims.

The present invention uses an entire ultrasonic waveform to find the time-of-flight of an ultrasound echo via cross-correlation. This approach, therefore, is not reliant upon just one feature of the waveform, such as a zero-crossing. The bolt gage described herein uses digital signal processing of the entire return waveforms, which contain more usable information than the single feature approach presently being used. Further, multiple software gages can be implemented and operated from common data in the present invention to add a redundant feature for improved measurement reliability.

Analysis Algorithms

The following is a description of several example algorithms which can be implemented for calculation of ultrasonic time-of-flight (TOF) in a fastener. For a given fastener, the TOF is a unique and monotonic function of the load tension in the fastener. Thus, if the TOF is measured, the corresponding bolt tension can be determined.

A recent article by the G.G. Leisk and A. Saigal, "Digital Computer Algorithms to Calculate Ultrasonic Wave Speed", Materials Evaluation, July 1996, described and compared five algorithms for calculating ultrasonic wave speeds for pulse-echo non-destructive characterization of materials. The article, incorporated herein by reference, deals with Overlap, Hilbert transform, phase-slope, cross correlation and Cepstrum algorithms. The article compares experimental results for self consistency based on the authors' particular interpretations and implementations of the algorithms.

The present invention is not limited to any one algorithm, or to any particular combination of algorithms. The present invention utilizes, as much as possible, algorithms which use the entire ultrasonic waveform as opposed to particular features, such as peaks or zero-crossings. Other waveform algorithms or even peaks and zero-crossings may be used as a redundant TOF measurement in order to increase the reliability of the measurements. It is taught herein that a TOF determined by several independent techniques, which yield the same results, is more reliable than any single technique's result.

Cross Correlation Analysis

Figure 2A:
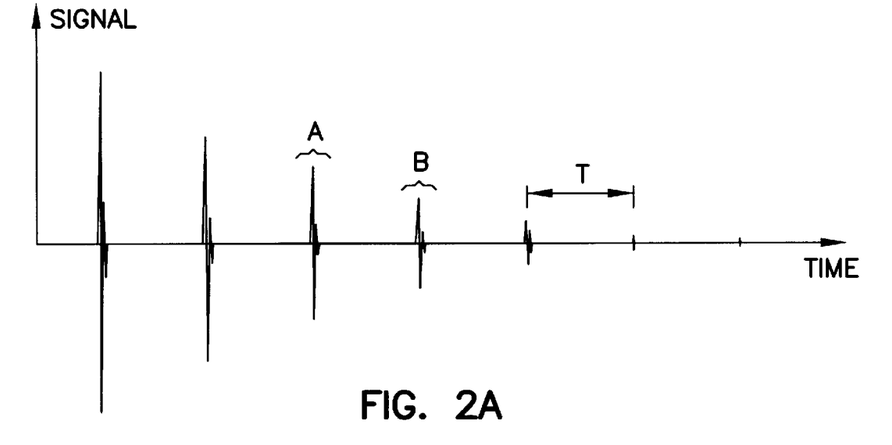
FIG. 2A illustrates a series of echo waveforms (ultrasonic pulse train)
Figure 2B:
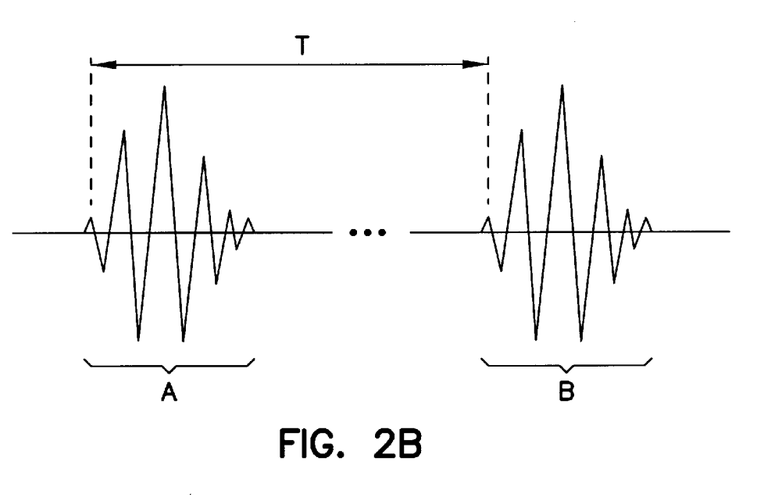
FIG. 2B is an expanded view of the echo waveforms of FIG. 2A.
Figure 2C:
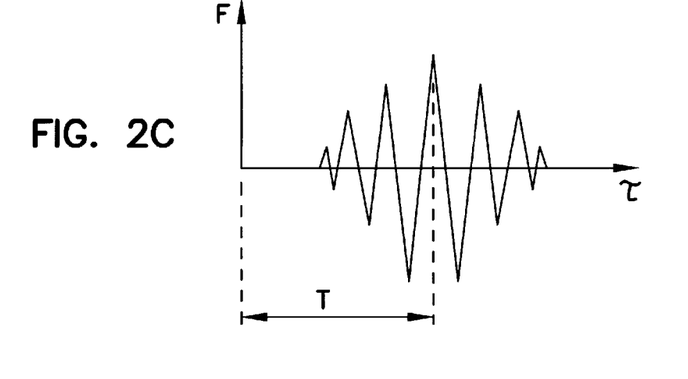
FIG. 2C is a cross-correlated function of the echo waveforms of FIG. 2B.

In the present invention, a "cross-correlation" of two signals A(t) and B(t) can be easily and simply expressed as:

$$F(\tau) = \int_{-\infty}^{+\infty} A(t)B(t-\tau)dt \qquad (1)$$

where A(t) is a first echo waveform and B(t−τ) is a second consecutive echo pulse offset by time τ. Because F(τ) is maximum when τ=T (see FIG. 2C), the TOF can be determined by varying τ until F(τ) is maximized. Contrary to Equation (1), the function is not integrated over infinity, just over the time windows of interest. For example, a window can be used from τ=0 to T, where [0,T] includes the first and second echoes in a pulse train. To illustrate this method, consider how a computer will calculate the function F(τ). At time τ=0, if the timing window is chosen properly, F(0) should be very close to zero, since A(t) and B(t) have no overlap and they individually integrate to zero. As the timing steps of τ increase, B is slid backwards in time until it starts to overlap A. When the first peak of B coincides with a last peak of A, the correlation integral will have its first positive peak. Later in τ, the last peak of A will match the first valley of B, the last valley of A will match the first peak of B, and the correlation will have its first (negative) valley. The process continues until B has slid in τ until it matches A as exactly as it can. The match may not be exact, due to distortion, but the correlation will have its global maximum peak. As τ continues to increase, the correlation will continue to oscillate, going through successively smaller maxima until it goes back to flat line zero. The τ for which the correlation function is maximum is the TOF.

Figure 2D:
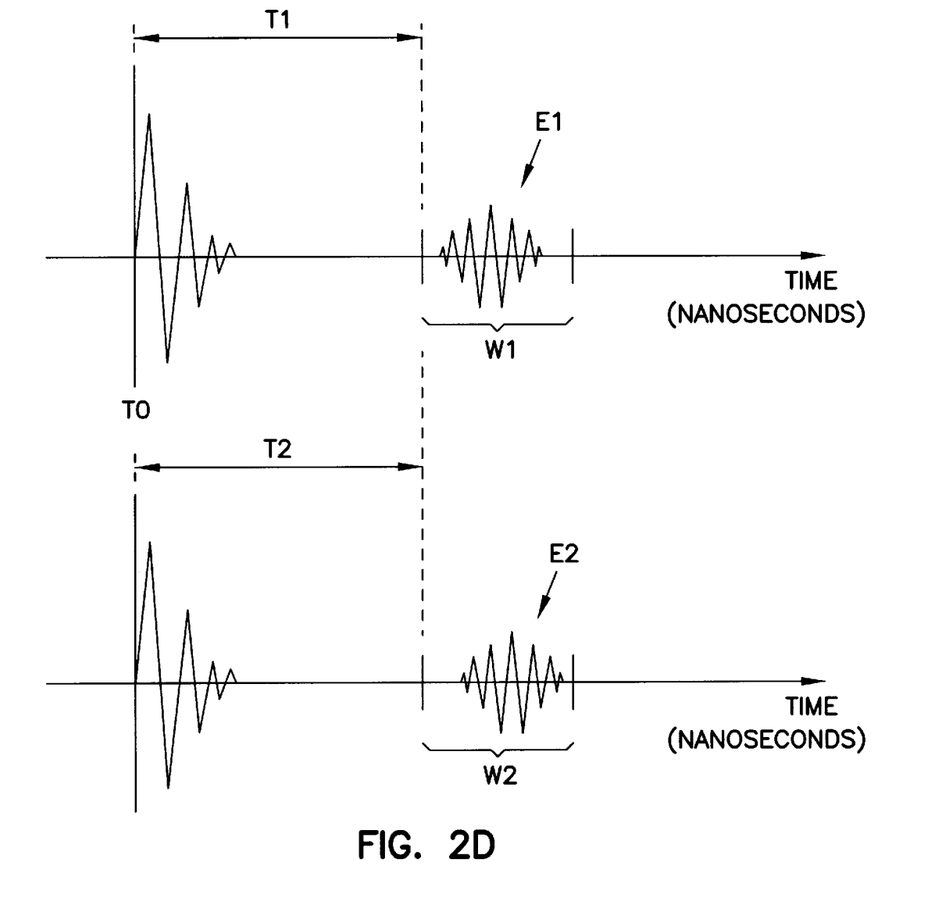
FIG. 2D illustrates a "first echo first echo" cross-correlation technique.
Figure 2E:
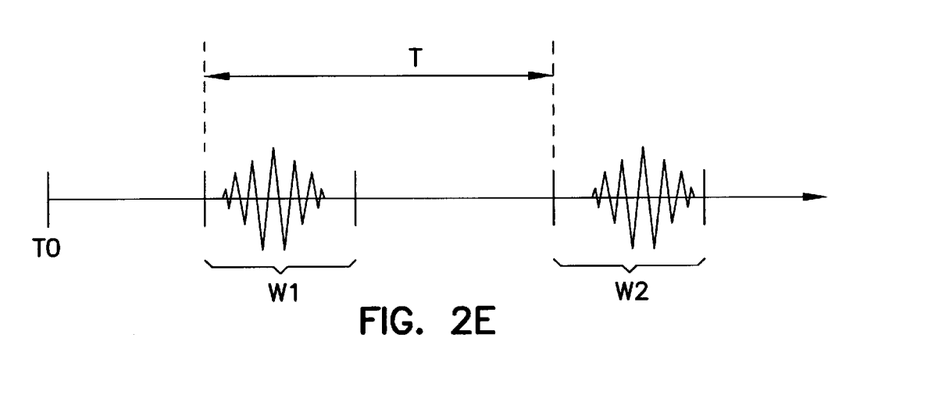
FIG. 2E illustrates a "first-second echo" cross-correlation technique.

Two specific methods for performing cross-correlation are described herein with reference to FIGS. 2D and 2E. The first method is referred to as "first-echo first-echo" correlation. In this method a waveform for the bolt in its initial tension state (usually slack, i.e. zero tension) is captured and stored. The portion of the waveform of interest is the first echo bounce. A window W1 is defined around the echo waveform, and a time T1 is measured from when the initial pulse was transmitted (T=0) and the start of the window, as illustrated in FIG. 2D. The waveform is assumed to be zero everywhere outside of the window, even though in reality the waveform is not zero. For analysis purposes, the waveform E1 in the window W1 and time T1 are stored for later use. At sometime later, the tension of the bolt may have changed. The same process, assuming the same transducer, cable, ect., is used to capture both another waveform E2 in a second time window W2 and its associated time T2 for the tensioned bolt. In many instances, time T1 and time T2 are equal or can be manipulated to be equal (eliminate time components contributed due to cables, etc.). The correlation algorithm is used to determine how far signal E2 must be moved earlier in time to get a maximum correlation between the two waveforms, E1 and E2. This time shift is used to identify the tension on the bolt.

The advantage of this technique over feature recognition is that it works even if the waveform E2 is so distorted that feature recognition methods would peak jump, and produce large errors. This technique uses all the information in the waveform, not just a particular feature which may or may not be available when the tension is changed. As indicated herein, because the waveform information is available, additional techniques such as feature recognition can be performed in conjunction with the cross correlation technique.

The second cross correlation technique is referred to herein as "first-second echo" correlation. In this technique, illustrated in FIG. 2F, two windows are defined in the same pulse train. That is, a first window is defined around a first echo E1, and a second window is defined around a second echo E2. These echoes can be consecutive or located anywhere in the pulse train relative to each other. Thus, the echoes do not have to be the first and second echoes of the pulse train. The time T required to shift signal E2 to maximize correlation between the two waveforms is determined. This time, therefore, is used to identify a tension in the bolt. The advantage of this cross correlation method is that variables in the test setup such as communication cables are eliminated.

Ultrasonic Bolt Gage System

Figure 3:
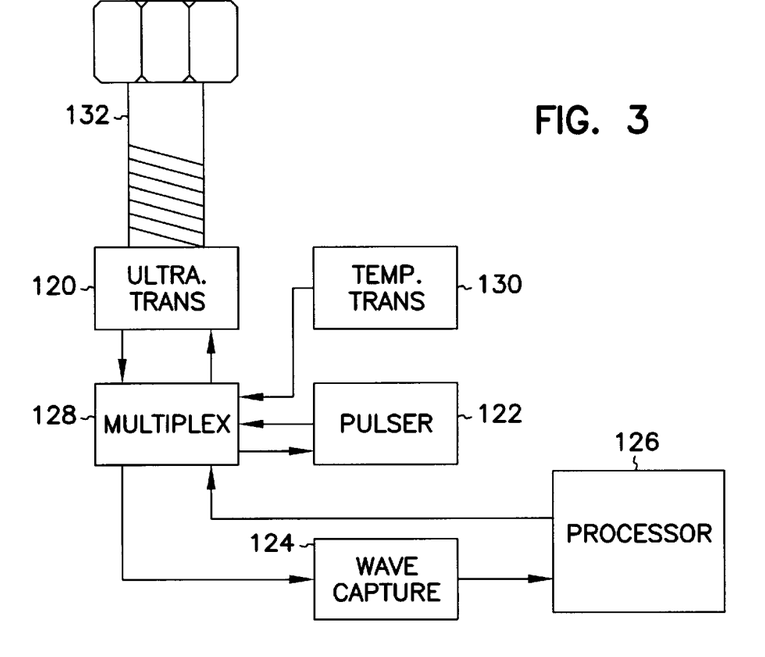
FIG. 3 is a block diagram of a bolt gage according to one embodiment of the present invention.

Referring to FIG. 3, a block diagram of one embodiment of an ultrasonic bolt gage system is described in detail. The ultrasonic system includes an ultrasonic transducer 120, a device for generating ultrasonic pulses 122, and a waveform capturing device 124. These waveforms are communicated over a general-purpose interface bus to a processor 126, or computer, which can be remotely located. An optional multiplex circuit 128 is used to provide pulse signals to, and received waveforms from a plurality of bolts to form a multi-channel system. A temperature transducer 130 is provided in close thermal proximity to each bolt 132 under test. The output from the temperature transducers can also be multiplexed to the processor.

In operation, the pulse generator is coupled to an ultrasonic transducer attached and sonically coupled to a bolt to be tested. An ultrasonic signal is transmitted through the tested bolt. Return echo waveforms from the ultrasonic signal are captured and transmitted to the processor. The temperature of the bolt, or joint coupled by the bolt, is also transmitted to the processor. The waveforms and temperature data are processed on the processor to determine the tension on the bolt. Multiple techniques, or modes, for data analysis are provided. These techniques include, but are not limited to, cross-correlation and at least one feature recognition. The cross-correlation technique provides an alternative method of measuring the amount of stretch as a result of the tensioning process. To determine a tension on a bolt, the processor is instructed to perform a cross-correlation, for example by series of integrations of a product of two time-windowed echo waveforms over a range of time shifts to identify a time-of-flight of the ultrasonic signals. The tension applied to the bolt is determined based upon the identified time-of-flight. Further, at least one feature recognition analysis can use either consecutive echo pulses in combination with a look-up table, or a stored un-tensioned echo waveform can be used in the analysis. The feature recognition can be zero-crossings or other waveform features. Further, other techniques such as the "Hilbert transform", "Cepstrum" or other mathematical techniques can be used as an additional method of identifying a time-of-flight.

It will be understood that the processor provides analysis outputs indicating a tension applied to a bolt using both cross-correlation and feature recognition analysis in response to a series of instructions executed by the processor. The processor can operate in response to firmware, or software to determine the tension on a bolt as derived from the time-of-flight of an ultrasonic pulse where the time-of-flight is determined by a multiplicity of different techniques including cross-correlation in conjunction with (checked by) feature recognition, rectification, and smoothing, or the like. It will be appreciated by those skilled in the art that the present invention can be equally applied to numerous fasteners referred generally herein as bolts. These fasteners can include, but are not limited to, bolt-nut combinations, single or double ended bolts, and threaded bolts or machine screws used without a nut. Additionally, this instrumentation can be used to determine tension in other applications such as truss rods in various structures, mine ceiling rods, and other structural applications.

EXAMPLE

Figure 4:
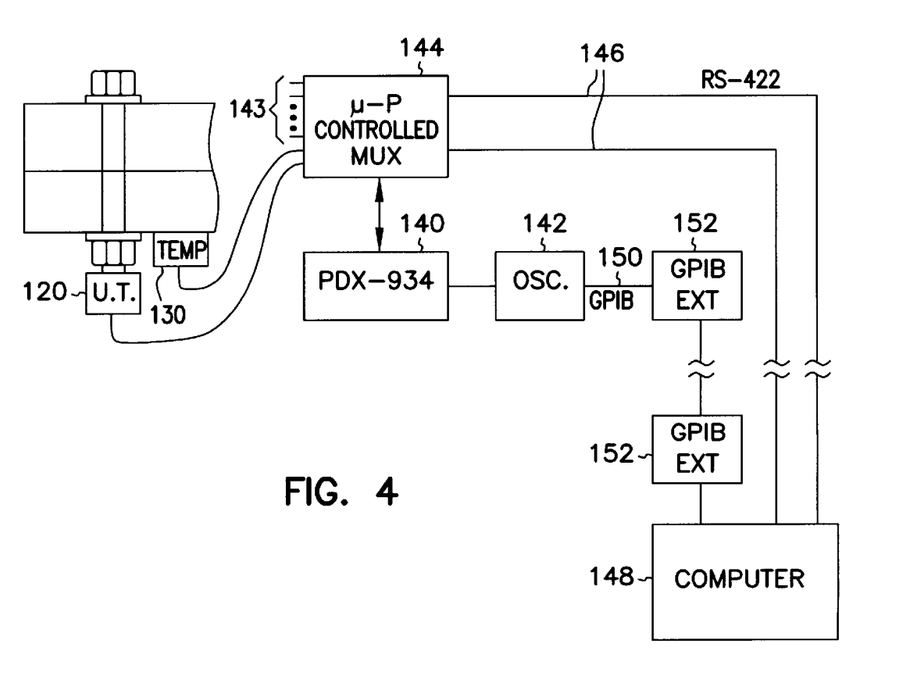
FIG. 4 is a block diagram of another bolt gage according to one embodiment of the present invention.

In one embodiment illustrated in FIG. 4, a commercially available ultrasonic bolt gage, such as a Raymond Engineering PDX934 bolt gage 140 is used for providing pulse signals to the ultrasonic transducer 120. To capture the waveforms from the ultrasonic transducer, a digital oscilloscope 142 is used. Further, a microprocessor controlled multiplexer subsystem 144 and two serial (RS-422) links 146 to a remote computer are provided for multiplexed communication with multiple ultrasonic transducers. In one embodiment, a Dallas 5000 TM microprocessor is used with other micro-circuitry as the microprocessor controlled multiplexer subsystem. Extra multiplexing connections 143 are illustrated for connecting to multiple ultrasonic and temperature transducers. The computer, in one embodiment, is a Macintosh computer operating LabView software from National Instruments.

The gage was desired to be controlled from 400 feet away from the space station "node" test article for safety reasons during pressure testing. The system also needed to remotely switch the gage from bolt to bolt, and to read the tension in the bolts as accurately as possible. The PDX934 was calibrated and was used to make test measurements as part of the improved system, but a vastly improved system was developed which incorporated our cross-correlation method of determining the time of flight of an ultrasonic pulse. The bolt gage 140 was used, in one embodiment, as a pulser for the ultrasonic transducer 120.

One of the links 146 was for the computer to allow remote adjustment of the gage 140 (delay, gain, and threshold settings). This allows the usual and necessary tuning of the bolt gage to acquire reliable data. The other link passed the output from the gage to the computer. The digital oscilloscope 142 was added to the system at the location of the gage (i.e., near the test article) to capture the ultrasonic signals and recognition gate waveforms. These waveforms were transmitted to the computer via an IEEE-488 parallel link 150 (with extenders 152). As long as the waveform was available, the accuracy of the system could be improved by using a cross-correlation technique and also by implementing a better feature recognition bolt gage or two in software, and then comparing the outputs of these gages. When the gage outputs are all consistent, a good tension reading is made. If the numbers from the different gages do not match, a problem exists which can be resolved by voting, or averaging, or otherwise adjusting as described below.

The example system provided a cross-correlation gage and two different feature recognition gages which used the PDX934 as an ultrasonic pulser. The present invention improves the ultrasonic bolt gage technology in at least two ways: 1) by using a cross-correlation technique, and 2) by combining the cross-correlation technique with the multiple feature recognition techniques. A sample of the data from the pressure test is provided in FIG. 5.

Figure 5:
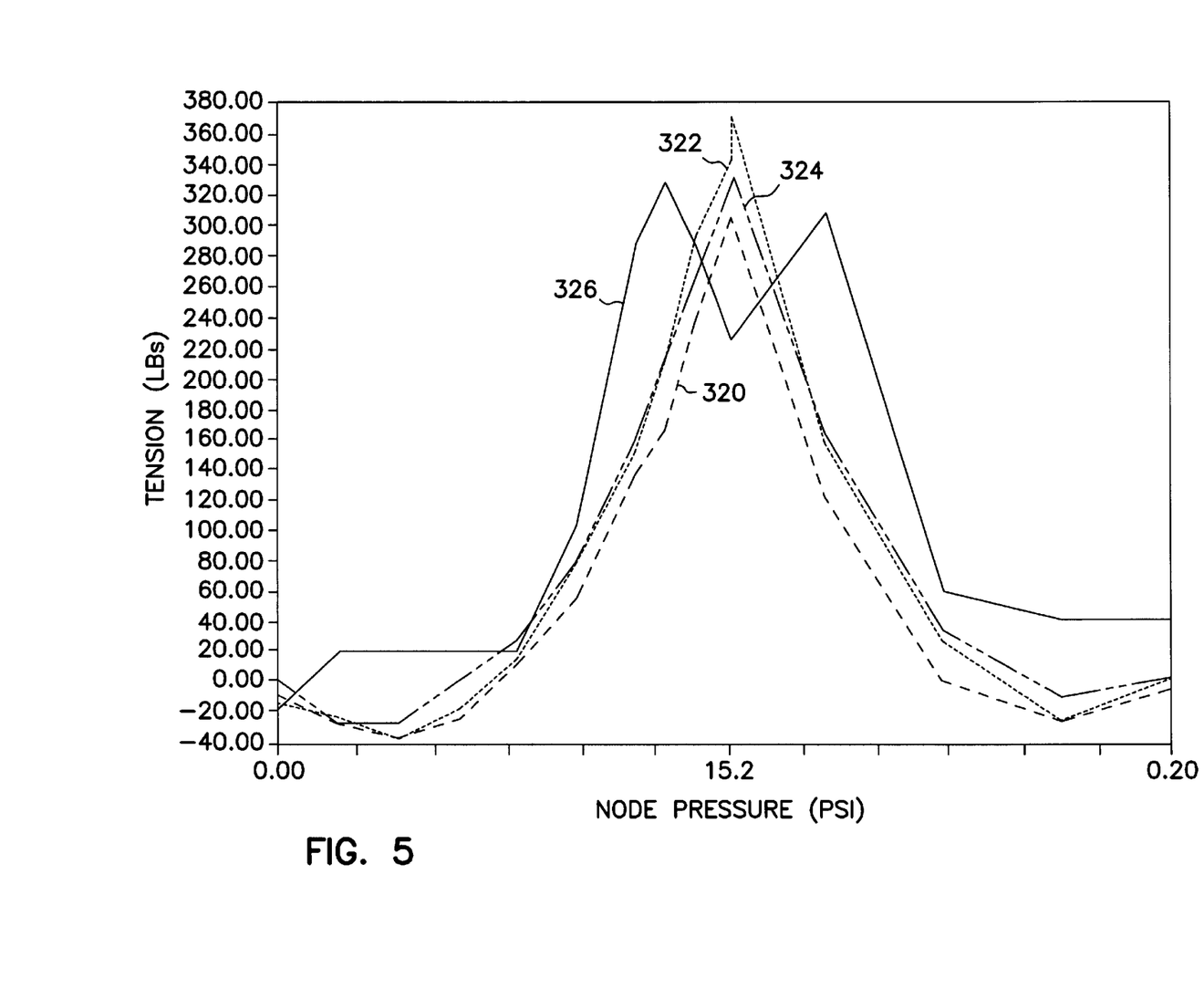
FIG. 5 is a graph comparing multiple modes of data analysis for different applied tensions.

FIG. 5 shows output from the cross-correlation gage 322 and two standard bolt gages 320, 324 plotted against load for the carbon steel bolt. FIG. 5 also shows a comparison of a classic PDX934 bolt gage 326 for the carbon steel bolt. The cross-correlation bolt gage reads TOF in nanoseconds and the standard gages read to one-ten thousandth of an inch. Either unit can be converted to bolt tension in pounds. What is illustrated is the change in tension with node pressure along the X-axis. The node was pressurized from 0 to 15.2 PSI, and then back again. It was noted that the standard bolt gage 326 output was not very stable in comparison to the present invention. That is, as the node pressure between plates secured by the bolt increased, the standard gage provided inaccurate tension readings. In the example illustrated, the problem was not peak jumping, but simple waveform distortion. The cross-correlation technique provides better resolution and precision, uses the same transducers, cabling, and fixtures as standard bolt gages and does not require the additional support equipment or field adjustments required for the standard gages. Therefore, time domain cross-correlation between the entire transmitted waveform and the entire received waveforms can be processed digitally to determine bolt length and bolt tension.

Ultrasonic Transducer Mounting Fixture

Figure 6A:
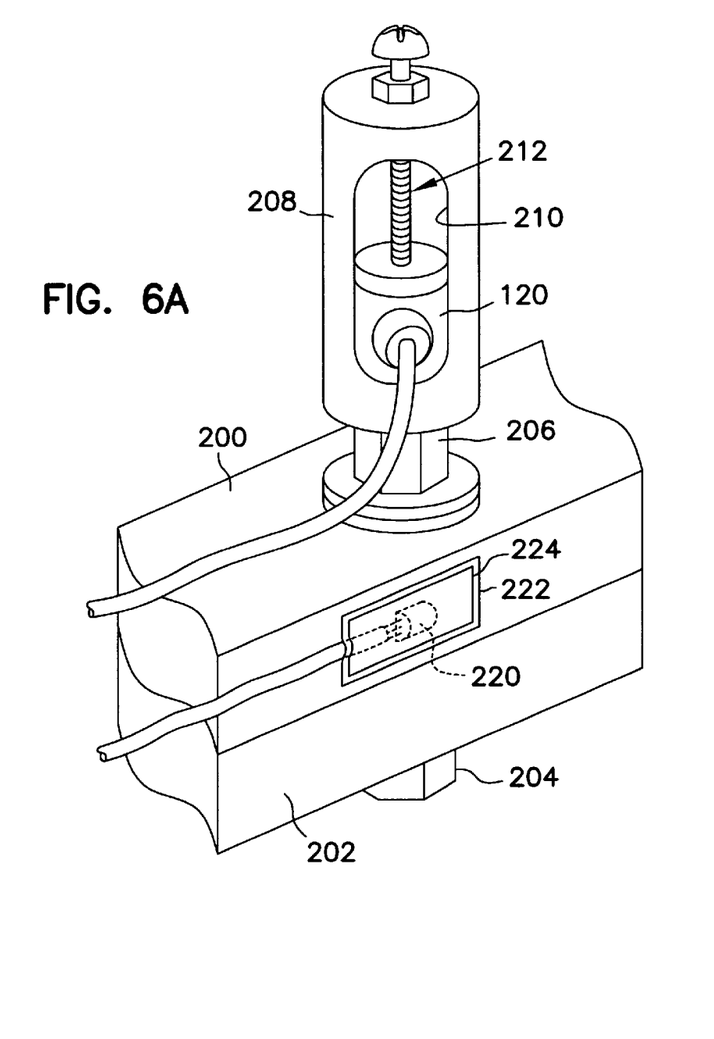
FIG. 6A is a three dimensional view of an ultrasonic transducer holder.
Figure 6B:
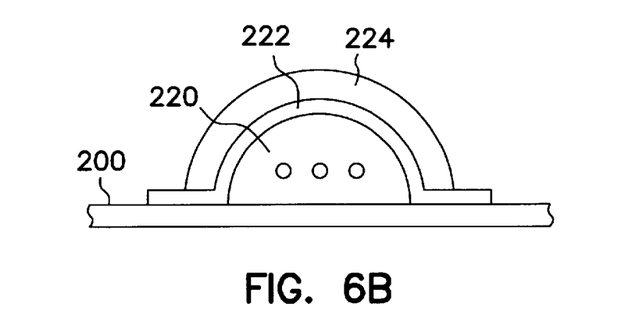
FIG. 6B illustrates one embodiment for mounting a temperature sensor.

Referring to FIGS. 6A and 6B, one example of an ultrasonic transducer coupled to a bolt is provided. Two flanges 200 and 202 are coupled together using a bolt 204 and nut 206 configuration. The bolt illustrated is inserted through the flanges from the bottom such that the nut engages the bolt on the top of flange. Some of the threads of the bolt will remain exposed above the nut (not shown) after the nut is tensioned to the bolt. A transducer holder 208 is threaded onto the bolt via the exposed threads. In a preferred embodiment, the transducer holder has an access window 210 provided in its side wall. Extending from the top of the transducer holder is a clamping mechanism 212 which provides pressure between the ultrasonic transducer and the end of the bolt. It will also be understood, that an adhesive or gel couplant can be used to attach the bolt in the ultrasonic transducer to more reliably couple the ultrasonic signals to the bolt.

A temperature sensor 220 is mounted in close proximity to the bolt 204. The temperature sensor is necessary because the speed of sound is used in data analysis and is dependent upon the temperature of the bolt, as well as stress in the bolt. Therefore, the temperature sensor is coupled to a flange using an adhesive system and an insulator. For simplicity, the temperature sensor can be taped 222 to the flange and foam tape 224 used as the insulator, see FIG. 6B. It will be appreciated, that the cables coming from both the ultrasonic transducer and in the temperature sensor should be strain-relieved to reduce stress on the ultrasonic transducer and the temperature sensor.

The above described mounting system is but one method of coupling the ultrasonic transducer and temperature sensor to a bolt for testing. Those skilled in the art can devise numerous variations to achieve the desired result of detecting ultrasonic echo signals transmitted through a bolt and detecting a temperature of the bolt during test. These numerous variations are contemplated in the present invention, and the above described system is not intended to be limiting.

Computer Screen Display

Figure 7:
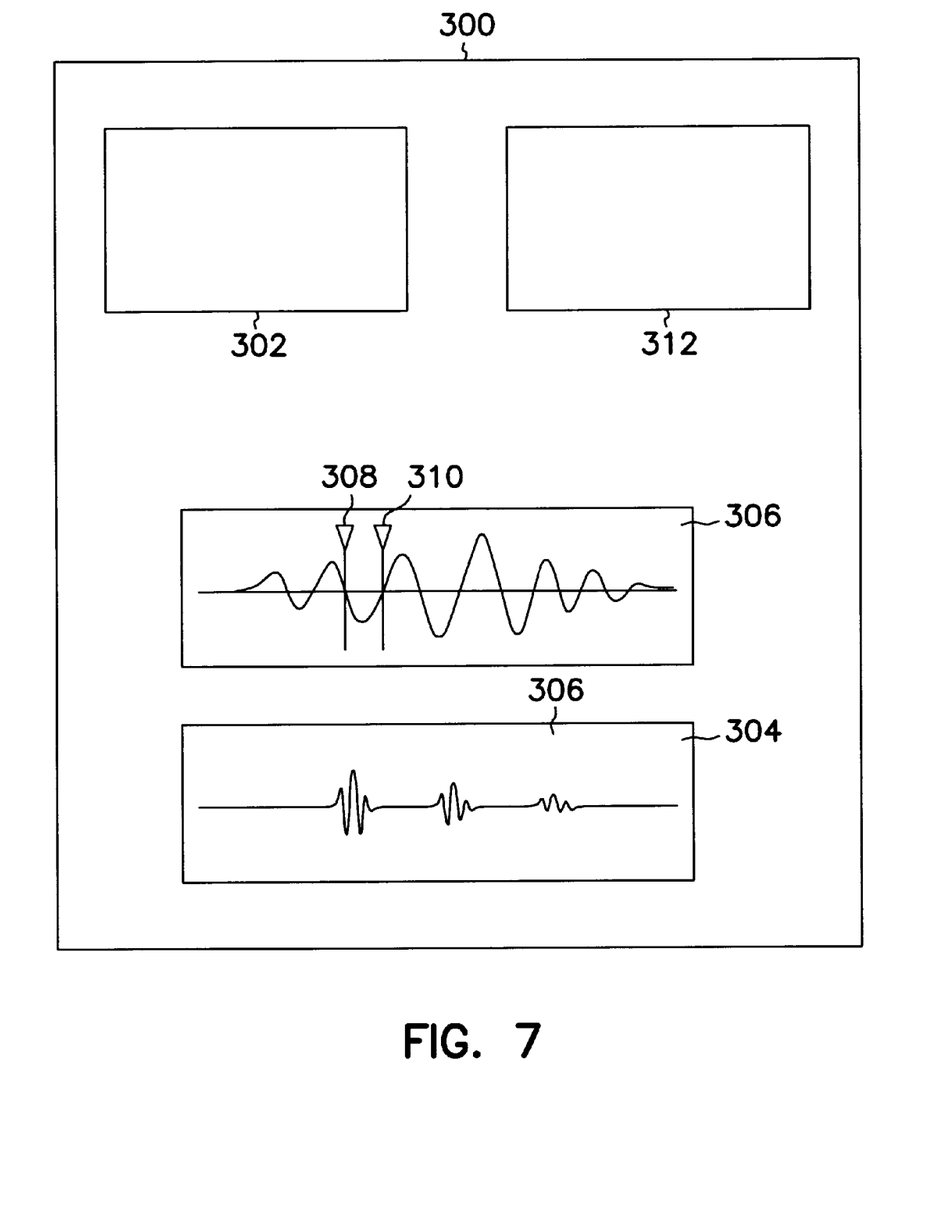
FIG. 7 is a block diagram of a computer screen included in one embodiment of the present invention.

Referring to FIG. 7, one example of a computer display screen 300 providing output for a user operating the ultrasonic bolt gage is illustrated. The screen includes an adjustment region 302 for the pulse generator 122 so that variables such as gain, threshold, and gate holdoff can be adjusted remotely from the computer 126. The screen also provides a visual illustration 304 of the echo waveforms captured during test. Further, a magnified image 306 of one of the echo waveforms is also provided. Pointers 308 and 310 are provided, and overlap the magnified image to illustrate both negative going zero crossing, and positive going zero crossing. These pointers are preferably different colors such as red and green. Again, these pointers are determined based upon the feature recognition executed by the computer, and do not have to be zero crossing points. In addition, the screen provides bolt tension data 312 from multiple analysis techniques. That is, tension data from multiple feature recognition analysis, and cross-correlation analysis are illustrated. It is anticipated that during operation the various analysis data will closely match. If any one of the data points varies greatly from the other data points, an error in determining the bolt tension can be avoided. For example, in a standard bolt gage using a single feature recognition point, side effects of the physical bolt tensioning process could create errors which would be illustrated as an anomaly on the computer screen, but would not be solely relied upon. Thus, an error which would have been experienced using standard bolt gages is avoided using the present invention.

Data Interpolation and Error Reduction

Interpolation can be used to augment the lower resolution of existing commercial digital data acquisition systems, as the present sampling rates are at 100 MHZ and are inadequate to achieve the required accuracies. Test results show that the waveforms do not contain frequency components greater than 10–15 MHZ, making it possible for interpolation techniques to estimate missing data points by suitable curve fitting. By doing this estimation, the probable error band is increased and must be taken into account.

A voting/vector matching operation is also contemplated to reduce errors. In this approach and by example, the first three or four zero-crossings of the ultrasonic echo are timed and compared with the initial tension state zero-crossing to calculate the delta time for each of the zero-crossings. If the delta times all agree, a more reliable timing result can be obtained. If the delta times do not agree, several courses of action may be taken. For example, a vote among the set of results can be taken and the value that least agrees can be discarded, or the values can be averaged to produce a result that is closer to the best estimated value than the worst case of the sample values.

Conclusion

An ultrasonic bolt gage has been described which uses a cross-correlation algorithm to determine a tension applied to a fastener, such as a bolt. The cross-correlation analysis is preferably performed using a processor operating on a series of captured ultrasonic echo waveforms. The ultrasonic bolt gage is further described as using the captured ultrasonic echo waveforms to perform additional modes of analysis, such as feature recognition. Thus, multiple tension data outputs can be obtained from a single data acquisition for increased reliability. In addition, one embodiment of the gage has been described as multi-channel, having a multiplexer for performing a tension analysis on one of a plurality of bolts.

Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention. Therefore, it is manifestly intended that this invention be limited only by the claims and the equivalents thereof.

What is claimed is:

1. An ultrasonic bolt gage comprising:
   an ultrasonic transducer for coupling to a bolt, transmitting ultrasonic signals through the bolt, and providing echo waveform output signals; and
   a processor coupled to the ultrasonic transducer for controlling the transmission of the series of ultrasonic signals and receiving the output signals, the processor providing analysis outputs indicating a tension applied to the bolt using both cross-correlation and feature recognition analysis.

2. The ultrasonic bolt gage of claim 1 further comprising a temperature sensor located in proximity to the bolt and having an output coupled to the processor.

3. The ultrasonic bolt gage of claim 1 further comprising a waveform capturing device coupled to the ultrasonic transducer for storing a digital representation of the echo waveform output signals.

4. The ultrasonic bolt gage of claim 3 wherein the waveform capturing device is an oscilloscope.

5. The ultrasonic bolt gage of claim 1 further comprising a multiplex circuit for coupling a plurality of ultrasonic transducers to the processor.

6. The ultrasonic bolt gage of claim 1 wherein the cross-correlation and feature recognition analysis are performed by the processor in response to a series of instructions executed by the processor.

7. The ultrasonic bolt gage of claim 1 wherein the feature recognition analysis recognizes at least two features of the echo waveform output signals.

8. The ultrasonic bolt gage of claim 7 wherein the at least two features of the echo waveform output signals are a positive-going zero crossing and a negative going zero crossing.

9. A multi-channel ultrasonic bolt gage comprising:
   a plurality of ultrasonic transducers for coupling to a plurality of bolts, transmitting ultrasonic signals through the bolts, and providing echo waveform output signals;
   a plurality of temperature sensors located in proximity to the plurality of bolts;
   a processor coupled to receive the echo waveform output signals and outputs from the plurality of temperature sensors, the processor providing analysis outputs indicating a tension applied to one of the plurality of bolts using both cross-correlation and feature recognition analysis;
   a waveform capturing device for storing a digital representation of the echo waveform output signals from the plurality of ultrasonic transducers and transmitting the echo waveform output signals to the processor; and
   a multiplex circuit for coupling one of the plurality of ultrasonic transducers to the waveform capturing device and coupling one of the plurality of temperature sensors to the processor.

10. The multi-channel ultrasonic bolt gage of claim 9 wherein the plurality of ultrasonic transducers are coupled to a plurality of bolts using a transducer holder threaded onto the bolts.

11. The multi-channel ultrasonic bolt gage of claim 9 wherein the analysis outputs indicating a tension applied to one of the plurality of bolts is visually displayed on a computer display screen.

12. A method of determining a tension applied to a bolt, the method comprising the steps of:

transmitting an ultrasonic signal through the bolt;

capturing a series of echo waveforms transmitted through the bolt; and cross-correlating two captured echo waveforms to determine the tension applied to the bolt.

13. The method of claim 12 further comprising the step of:

performing a feature recognition analysis on the series of echo waveforms to provide a second determination of the tension applied to the bolt.

14. The method of claim 12 wherein the step of transmitting the series of ultrasonic signals comprises the steps of:

communicably coupling a processor and an ultrasonic transducer which is attached to the bolt; and activating the ultrasonic transducer using the processor.

15. The method of claim 12 wherein the step of capturing a series of echo waveforms comprises the steps of:

communicably coupling a waveform capturing device to an ultrasonic transducer which is attached to the bolt; and storing the series of echo waveforms in a digital format in the waveform capturing device.

16. The method of claim 12 wherein the step of cross-correlating comprises the steps of:

communicating the captured series of echo waveforms to a processor;

instructing the processor to perform a series of integrations of a product of two time-windowed echo waveforms over a range of time shifts to identify a time-of-flight of the ultrasonic signals; and determining a tension applied to the bolt based upon the identified time-of-flight.

17. The method of claim 12 further comprising the step of determining a temperature of the bolt.

18. The method of claim 17 further comprising the step of communicating the temperature of the bolt to the processor.

* * * * *